(12) United States Patent
Cao

(10) Patent No.: US 6,215,926 B1
(45) Date of Patent: *Apr. 10, 2001

(54) FIBER OPTIC DENSE WAVELENGTH DIVISION MULTIPLEXER WITH A PHASE DIFFERENTIAL METHOD OF WAVELENGTHS SEPARATION UTILIZING GLASS BLOCKS AND A NONLINEAR INTERFEROMETER

(75) Inventor: Simon X. F. Cao, Fremont, CA (US)

(73) Assignee: Avanex Corporation, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/248,021

(22) Filed: Feb. 10, 1999

(51) Int. Cl.$^7$ .............................. G02B 6/34; G02B 27/00; G01B 9/02

(52) U.S. Cl. ............................. 385/36; 385/24; 356/345; 356/352; 359/577

(58) Field of Search .......................... 385/14–24, 31–38, 385/40; 359/124, 577, 130–131; 356/352

(56) References Cited

U.S. PATENT DOCUMENTS

| | | | |
|---|---|---|---|
| 4,558,950 | * 12/1985 | Ulrich et al. | 356/345 |
| 4,741,588 | * 5/1988 | Nicia et al. | 385/36 |
| 4,763,969 | * 8/1988 | Khoe et al. | 385/36 |
| 4,884,868 | * 12/1989 | Bohm | 385/36 |
| 5,381,232 | * 1/1995 | Van Wijk | 356/352 |
| 5,841,583 | * 11/1998 | Bhagavatula | 359/577 |
| 5,852,505 | * 12/1998 | Li | 385/24 |

OTHER PUBLICATIONS

"Introduction To Modern Optics", Grant R. Fowles, Second Addition, Dover Publications, Inc., New York, pp. 38–47.

* cited by examiner

Primary Examiner—Thong Nguyen
(74) Attorney, Agent, or Firm—Sawyer Law Group LLP

(57) ABSTRACT

A dense wavelength division multiplexer for the separating of an optical signal into optical channels is provided. The dense wavelength division multiplexer of the present invention includes a mechanism of inputting an optical signal where the optical signal contains a plurality of optical channels; a mechanism of separating one or more of the plurality of optical channels by introducing a phase difference between at least two the channels of the optical signal; and a mechanism for outputting the separated plurality of channels along a plurality of optical paths. The mechanism of separating one or more of the plurality of optical channels includes utilizing glass blocks and a nonlinear interferometer. The present invention provides an ease in alignment and a higher tolerance to drifts due to the increase in the width of the pass bands. It may also be easily modified to perform the add/drop function as it separates channels. The materials required to manufacture and implement the dense wavelength division multiplexer in accordance with the present invention are readily available. The present invention thus does not require special or expensive materials or processes. It is thus cost effective.

17 Claims, 10 Drawing Sheets

FIBER OPTIC DENSE WAVELENGTH DIVISION MULTIPLEXER WITH A PHASE DIFFERENTIAL METHOD OF WAVELENGTHS SEPARATION UTILIZING GLASS BLOCKS AND A NONLINEAR INTERFEROMETER

FIELD OF THE INVENTION

The present invention relates to fiber optic networks, and more particularly to fiber optic wavelength division multiplexers.

BACKGROUND OF THE INVENTION

Fiber optic networks are becoming increasingly popular for data transmission due to their high speed and high data capacity capabilities. Multiple wavelengths may be transmitted along the same optic fiber. The totality of multiple combined wavelengths comprises a single transmitted signal. A crucial feature of a fiber optic network is the separation of the optical signal into its component wavelengths, or "channels", typically by a wavelength division multiplexer. This separation must occur in order for the exchange of wavelengths between signals on "loops" within networks to occur. The exchange occurs at connector points, or points where two or more loops intersect for the purpose of exchanging wavelengths.

In this specification, individual information-carrying lights are referred to as "channels". The totality of multiple combined channels in a wavelength-division multiplexed optical fiber, optical line or optical system, where each channel is of a different wavelength range, is referred to as an "optical signal". The term "wavelength" is used synonymously with the term "channel". Although each information-carrying channel actually comprises light of a certain range of physical wavelengths, for simplicity, a single channel is referred to as a single wavelength.

Add/drop systems exist at the connector points for the management of the channel exchanges. The exchanging of data signals involves the exchanging of matching wavelengths from two different loops within an optical network. In other words, each signal drops a channel to the other loop while simultaneously adding the matching channel from the other loop. The adding and dropping of channels always occur together.

FIG. 1 illustrates a simplified optical network 100. A fiber optic network 100 could comprise a main loop 150 which connects primary locations, such as San Francisco and New York. In-between the primary locations is a local loop 110 which connects with loop 150 at connector point 140. Thus, if local loop 110 is Sacramento, wavelengths at San Francisco are multiplexed into an optical signal which will travel from San Francisco, add and drop channels with Sacramento's signal at connector point 140, and the new signal will travel forward to New York. Within loop 110, optical signals would be transmitted to various locations within its loop, servicing the Sacramento area. Local receivers (not shown) would reside at various points within the local loop 110 to convert the optical signals into the electrical signals in the appropriate protocol format.

The separation of an optical signal into its component channels is typically performed by a dense wavelength division multiplexer. FIG. 2 illustrates add/drop systems 200 and 210 with dense wavelength division multiplexers 220 and 230. An optical signal from Loop 110 ($\lambda_1$–$\lambda_n$) enters its add/drop system 200 at node A (240). The signal is separated into its component channels by the dense wavelength division multiplexer 220. Each channel is then outputted to its own path 250-1 through 250-n. For example, $\lambda_1$ would travel along path 250-1, $\lambda_2$ would travel along path 250-2, etc. In the same manner, the signal from Loop 150 ($\lambda_1'$–$\lambda_n'$) enters its add/drop system 210 via node C (270). The signal is separated into its component channels by the wavelength division multiplexer 230. Each channel is then outputted via its own path 280-1 through 280-n. For example, $\lambda_1'$ would travel along path 280-1, $\lambda_2'$ would travel along path 280-2, etc.

In the performance of an add/drop function, for example, $\lambda_1$ is transferred from path 250-1 to path 280-1. It is combined with the others of Loop 150's channels into a single new optical signal by the dense wavelength division multiplexer 230. The new signal is then returned to Loop 150 via node D (290). At the same time, $\lambda_1'$ is transferred to path 250-1 from 280-1. It is combined with the others of Loop 110's channels into a single optical signal by the dense wavelength division multiplexer 220. This new signal is then returned to Loop 110 via node B (260). In this manner, from Loop 110's frame of reference, channel $\lambda_1$ of its own signal is dropped to Loop 150 while channel $\lambda_1'$ of the signal from Loop 150 is added to form part of its new signal. The opposite is true from Loop 150's frame of reference. This is the add/drop function.

Conventional methods used by wavelength division multiplexers in separating an optical signal into its component channels include the use of filters and fiber gratings as separators. A "separator," as the term is used in this specification, is an integrated collection of optical components functioning as a unit which separates one or more channels from an optical signal. Filters allow a target channel to pass through while redirecting all other channels. Fiber gratings target a channel to be reflected while all other channels pass through. Both filters and fiber gratings are well known in the art and will not be discussed in further detail here.

A problem with the conventional separators is the precision required of a device for transmitting a signal into an optic fiber. A signal entering a wavelength division multiplexer must conform to a set of very narrow pass bands. FIG. 3 shows a sample spectrum curve 310 composed of numerous channels as they enters a dense wavelength division multiplexer. The pass bands 320 of the channels are very narrow. Ideally, the curve would be a square wave. A narrow pass band is problematic because, due to the physical limitations and temperature sensitivity of signal source devices, they never emit light exactly at the center wavelengths of the pass bands of an optical filter. The difference between the actual wavelength and the center of the pass band is called the "offset." The amount of offset or change in offset ("drift") ideally should not be larger than the width of the pass band. Otherwise, crosstalk between channels will be too large. Crosstalk occurs when one channel or part of a channel appears as noise on another channel adjacent to it. Since the signals resulting from the conventional wavelength division multiplexer configurations have narrow pass bands, the signal source devices ("transmitters"), such as lasers or the like, must be of a high precision so that drift is limited to the width of the pass bands. This high precision is difficult to accomplish. Signal source devices of high precision are available but are very expensive. Also, the signal source devices must be aligned individually for each separator, which is time intensive.

Therefore, there exists a need for a wavelength division multiplexer with a method of separation which has a greater tolerance for drift and is easier to align. This method should also be cost effective to implement. The present invention addresses such a need.

SUMMARY OF THE INVENTION

A dense wavelength division multiplexer for the separating of an optical signal into optical channels is provided. The dense wavelength division multiplexer of the present invention includes a mechanism of inputting an optical signal where the optical signal contains a plurality of optical channels; a mechanism of separating one or more of the plurality of optical channels by introducing a phase difference between at least two the channels of the optical signal; and a mechanism for outputting the separated plurality of channels along a plurality of optical paths. The mechanism of separating one or more of the plurality of optical channels includes utilizing glass blocks and a nonlinear interferometer. The present invention provides an ease in alignment and a higher tolerance to drifts due to the increase in the width of the pass bands. It may also be easily modified to perform the add/drop function as it separates channels. The materials required to manufacture and implement the dense wavelength division multiplexer in accordance with the present invention are readily available. The present invention thus does not require special or expensive materials or processes. It is thus cost effective.

DETAILED DESCRIPTION

The present invention relates to an improvement in a dense wavelength division multiplexer. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

A dense wavelength division multiplexer in accordance with the present invention provides for a higher tolerance to drifts and ease of alignment. Its separators may be placed in a multi-stage parallel cascade configuration to reduce insertion loss. The present invention may also be easily modified to perform the add/drop function as it separates channels. The method does not require special or expensive materials or processes, and thus is cost effective to implement.

To more particularly describe the features of the present invention, please refer to FIGS. 4 through 10 in conjunction with the discussion below.

Figure 4:
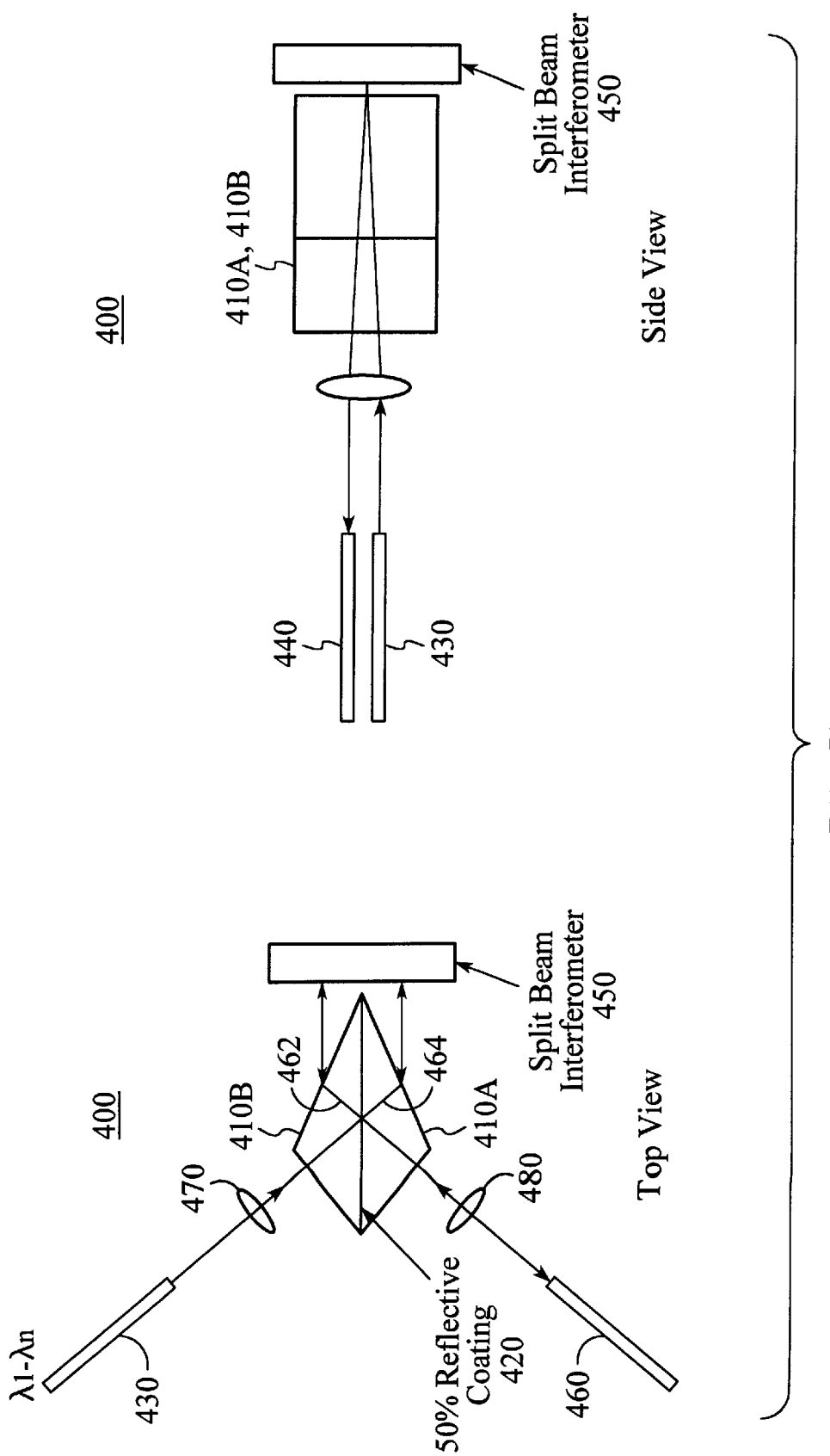
FIG. 4 is an illustration of a preferred embodiment of a separator in accordance with the present invention.

FIG. 4 illustrates the preferred embodiment of a separator in accordance with the present invention. The separator 400 comprises an input fiber 430 for inputting an optical signal, and two output fibers 440 and 460. It comprises two lenses 470 and 480 which collimate the input signal as it comes from the input fiber 430 and converge the output signal to the output fibers 440 and 460. It also comprises two blocks of glass 410A–410B placed next to each other. Adjacent to one side of the blocks 410A and 410B where the index of refraction for glass block 410A is greater than the index of refraction for glass block 410B is a nonlinear interferometer 450 which introduces a phase difference into the even channels while maintaining the same phase for the odd channels. At the place where the two blocks 410A–410B meet, the glass is coated with a reflective coating 420 with a reflectivity, for example, of 50%.

Figure 6:
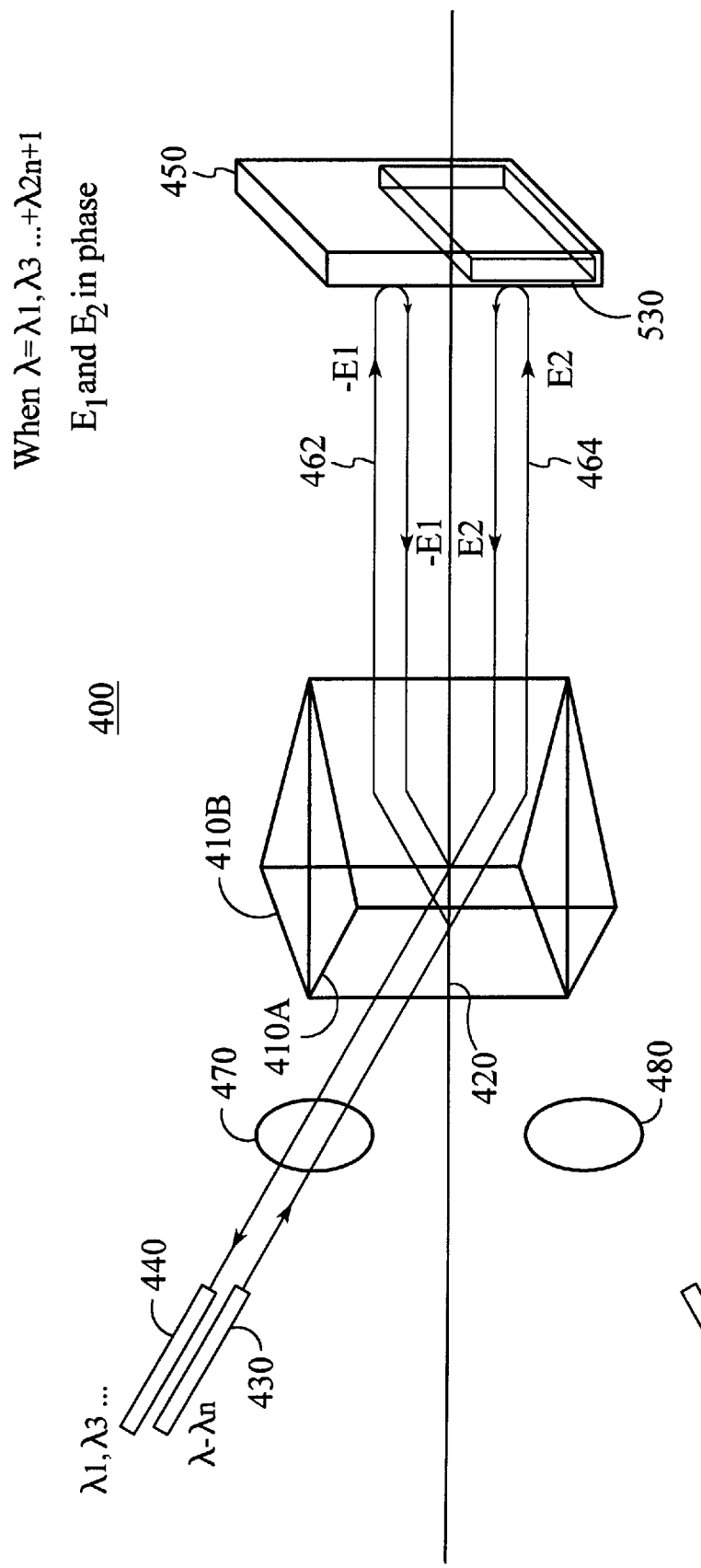
FIGS. 6 and 7 illustrate the odd and even channels of an input signal as they travel through the separator in accordance with the present invention.
Figure 7:
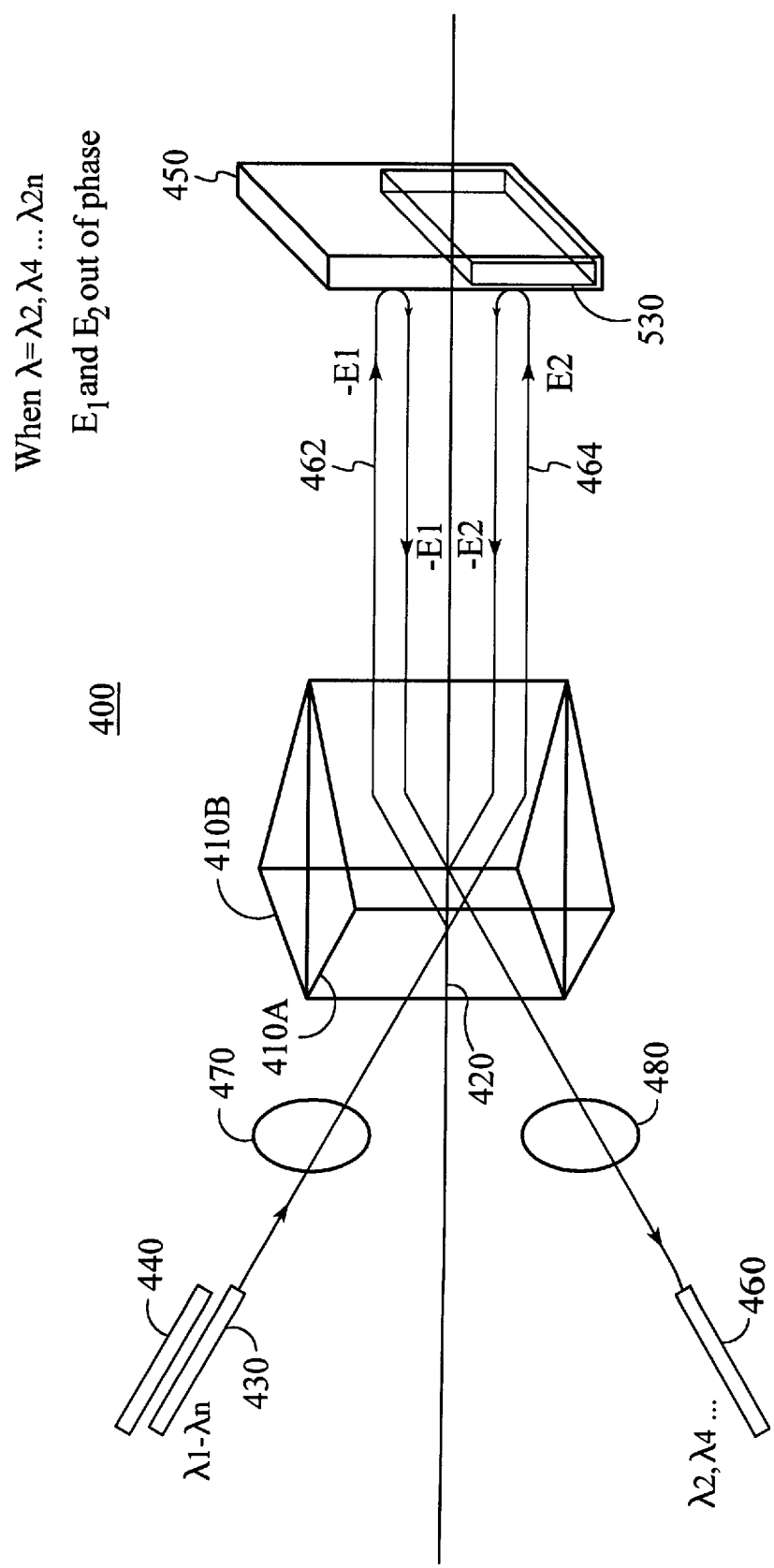

The reflective coating 420 splits the optical signal containing $\lambda_1$–$\lambda_n$ into at least two portions 462, 464. According to the general operation of beam splitters, when light travels through glass block 410B and then is reflected from a surface of glass block 410A (which has a greater index of refraction than glass block 410B), the light undergoes a $\pi$ phase shift. This $\pi$ phase shift is indicated in FIGS. 6 and 7 by the negative sign of the electric field (−E1) associated with signal 462 after it is reflected at the 50% reflective coating 420. Otherwise, the light does not undergo a phase shift, as is indicated by the positive sign of the electric field (E2) associated with signal 464 after it is transmitted through the 50% reflective coating 420 in FIGS. 6 and 7. This reflection phase flip is very well known in the art and will not be further described here. In the preferred embodiment, the reflective coating 420 is polarization insensitive. The nonlinear interferometer 450 then introduces a $\pi$ phase difference into the even channels while maintaining the phase of the odd channels. The two output fibers 440 and 460 are then aligned, or placed at a particular distance from the separator 400, such that even channels are captured in one fiber while the odd channels are captured in the other.

Although the separator in accordance with the present invention has been described with two glass pieces adjacent to a nonlinear interferometer, one of ordinary skill in the art will understand that other materials and configurations may be used to accomplish the same separation of channels without departing from the spirit and scope of the present invention.

Figure 5:
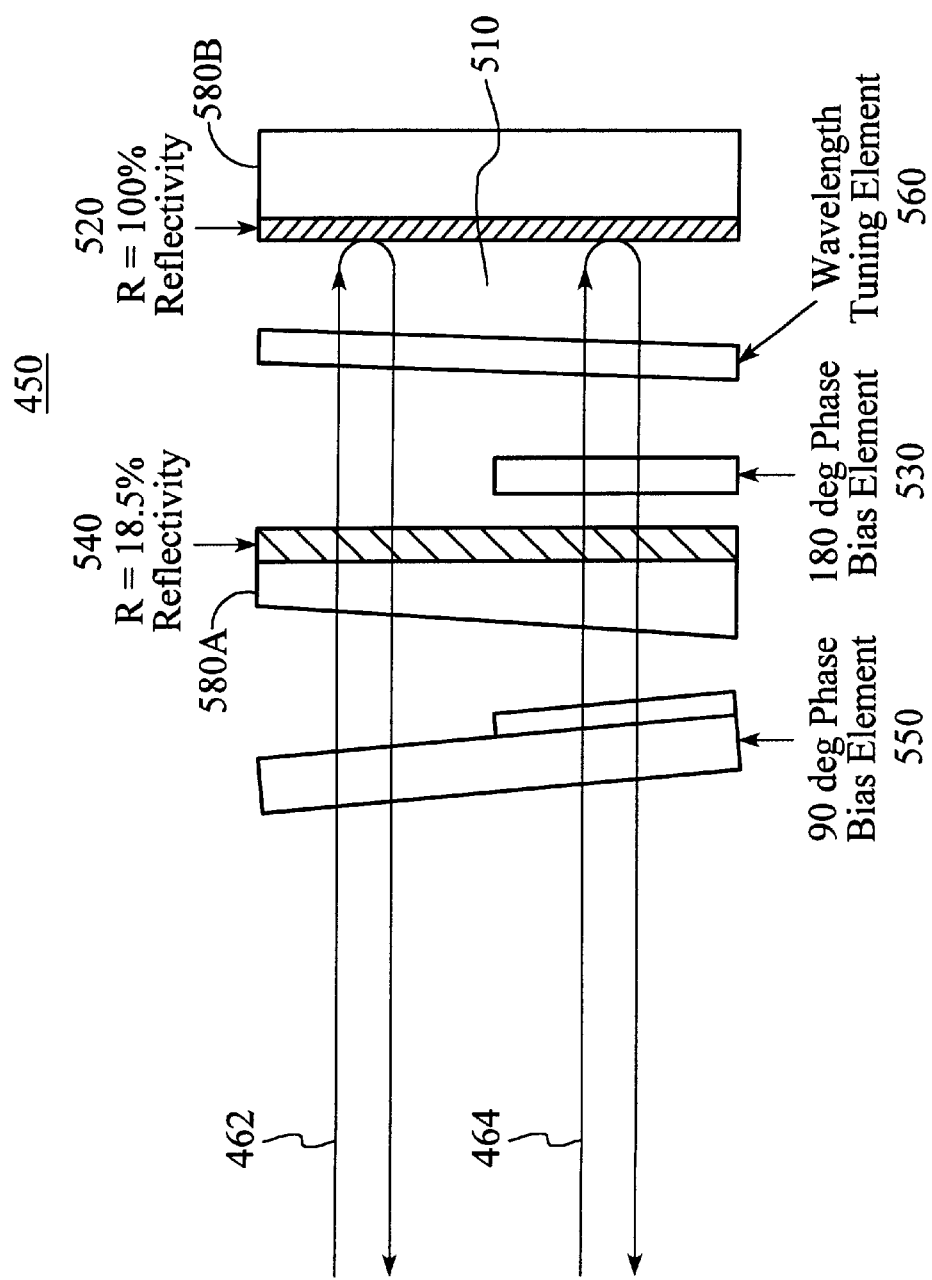
FIG. 5 is an illustration of a nonlinear interferometer used with a separator in accordance with the present invention.

An example of a nonlinear interferometer which may be used with the separator 400 of the present invention has been disclosed in co-pending U.S. patent application entitled "Nonlinear Interferometer for Fiber Optic Dense Wavelength Division Multiplexers Utilizing a Phase Differential Method of Wavelength Separation," Ser. No. 09/247,253, filed on Feb. 10, 1999. Applicant hereby incorporates the co-pending application by reference. FIG. 5 illustrates a nonlinear interferometer 450 as disclosed in U.S. patent application Ser. No. 09/247,253. Its structure comprises two glass plates 580A–580B, creating a space 510 therebetween. The inside face of the glass plate 580B is coated with a reflective coating 520 with a reflectivity of 100%. The inside face of the glass plate 580A is coated with a reflective coating 540 with a reflectivity of approximately 18%. A phase bias element 530, preferably of 180 degrees, is placed between the glass plates 580A and 580B, protruding partially into the space 510. The 180 degree phase bias element 530 will introduce a phase shift of π into the even channels of the signal 464 while maintaining the phase of the odd channels. The phase bias element 550, preferably of 90 degrees, and the wavelength tuning element 560 change the shape of the curve of the channels, as will be described later.

FIG. 6 illustrates the odd channels of an input signal as it travels through the separator 400 of the present invention. An input signal ($\lambda_1$–$\lambda_n$) enters the separator 400 through input fiber 430. The signal travels through the lens 470 which contains the signal and directs it toward the glass blocks 410A and 410B. The signal travels through the glass blocks 410A and 410B, and when it reaches the 50% reflective coating 420, it is split into two signals 462 (–E1) and 464 (E2). Signal 462 reflects from the reflective coating 420 with a π change in phase, and travels to and back from the interferometer 450 without a change in its phase. Signal 464 transmits through the reflective coating 420 without a change in phase, and also travels to and back from the interferometer 450, including the 180 degree phase bias element 530, but no phase change is introduced into its odd channels. Returning from the interferometer 450, signal 462 is reflected from the reflective coating 420 to output fiber 440 with a π change in phase and transmitted through to output fiber 460 without a change in phase. Signal 464 is transmitted through to output fiber 440 and reflected to output fiber 460 without a change in phase. Thus, when the odd channels of signals 462 and 464 travel back from the interferometer 450 and the glass blocks 410A and 410B, they are in phase in output fiber 440 but out of phase in output fiber 460.

FIG. 7 illustrates the even channels of an input signal as they travel through the separator 400 of the present invention. The even channels travel through the separator 400 in same manner as the odd channels, described above with FIG. 6, however, when the even channels of signal 464 enter the interferometer 450, they travel through the 180 degree phase bias element 530 which introduces a π phase change. When the signals 462 and 464 travel back from the interferometer 450 and the glass blocks 410A and 410B, their even channels are out of phase in output fiber 440 but in phase in output fiber 460.

Although the separator 400 of the present invention has been disclosed with an interferometer structure illustrated in FIG. 5, one of ordinary skill in the art will understand that other structures which introduce a phase difference between channels of an optical signal can be used without departing from the spirit and scope of the present invention.

By separating channels in this manner, the separator 400 of the present invention broadens the pass and isolation bands of the signals. Referring back to FIG. 5, when signals 462 and 464 enter the interferometer 450, they pass through the 18% reflective coating 540. Eighteen percent (18%) of the signals 462 and 464 are reflected by the 18% reflective coating 540 while the remaining 82% travel to the 100% reflective coating 520. The 100% reflective coating 520 sends the remaining signals back across to the 18% reflective coating 540. 18% of the remaining signals are then reflected by the 18% reflective coating 540 while the rest exit the interferometer 450. This 18% that are reflected then retravel to the 100% reflective coating 520. This process repeats until substantially all portions of the signals 462 and 464 exit the interferometer 450. By forcing signals 462 and 464 to travel multiple times back and forth through the interferometer 450 before exiting, the controlled changing of the shape of the signals nonlinearly occurs such that the tips of the signal's curves are flattened and a small amount of band shape distortion is allowed. The 90 degree bias element 550 and the wavelength tuning element 560 (FIG. 5) fine tune the shapes and positions of the pass bands to their desired properties.

Figure 1:
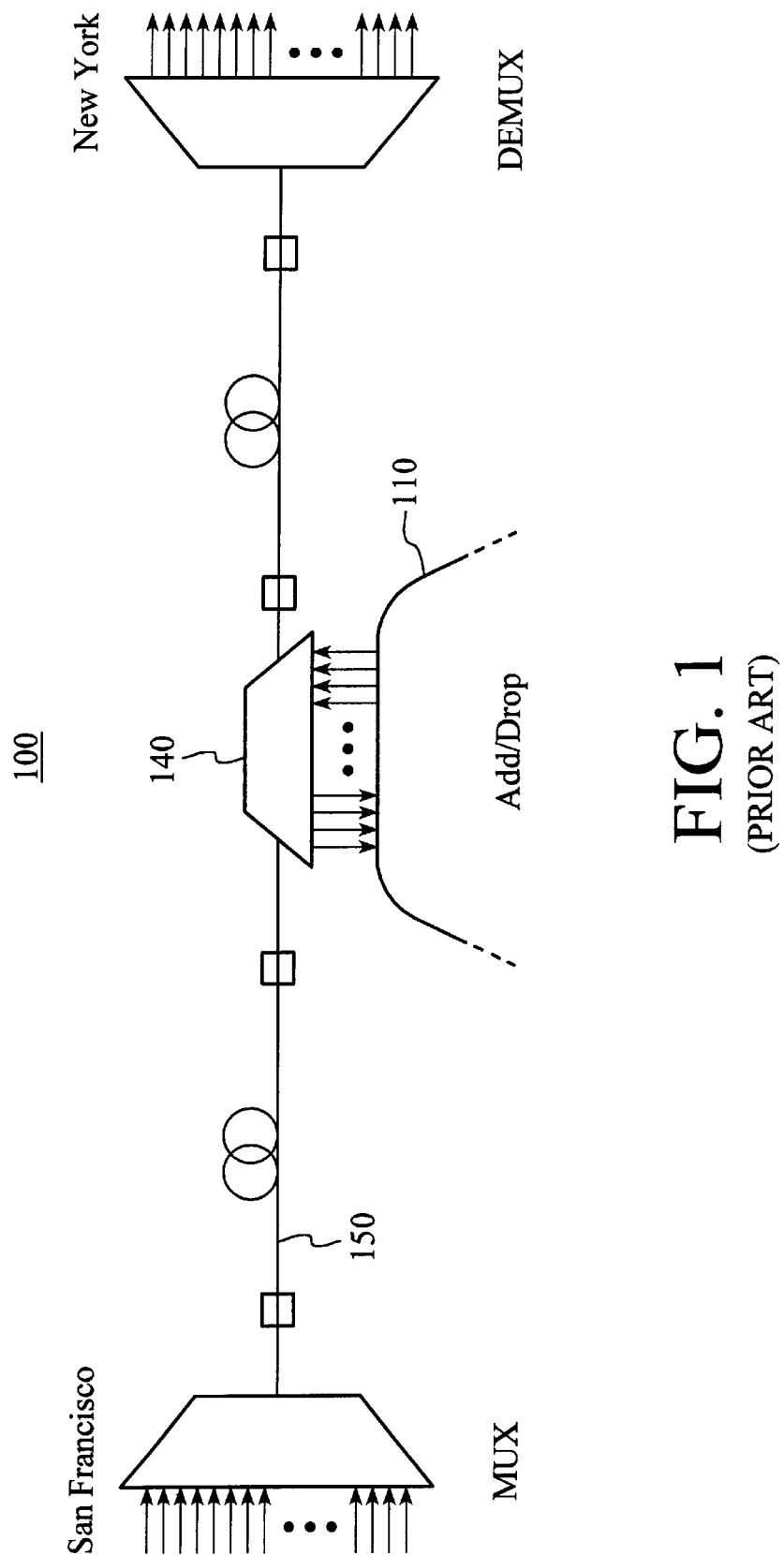
FIG. 1 is an illustration of a simplified optical network.
Figure 2:
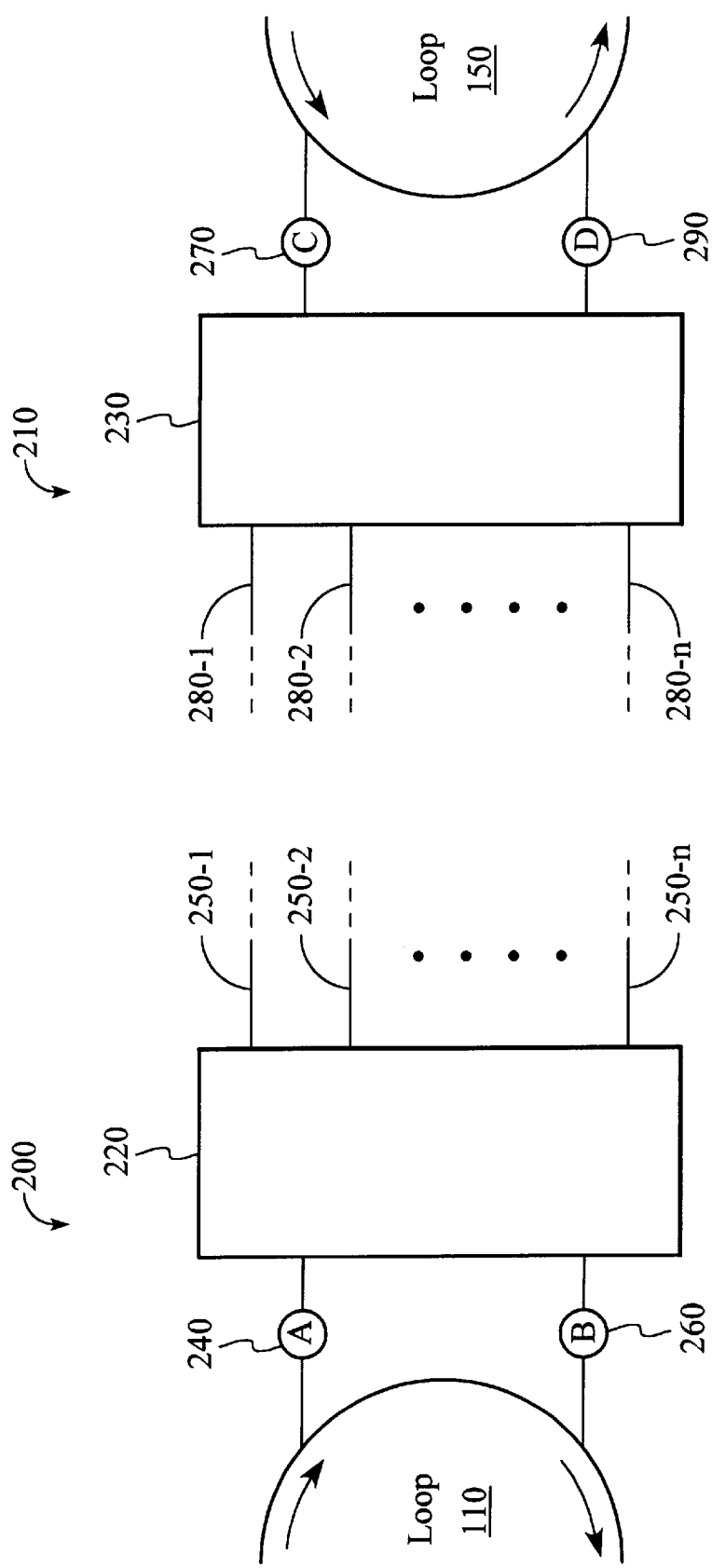
FIG. 2 is an illustration of an add/drop system and dense wavelength division multiplexers.
Figure 3:
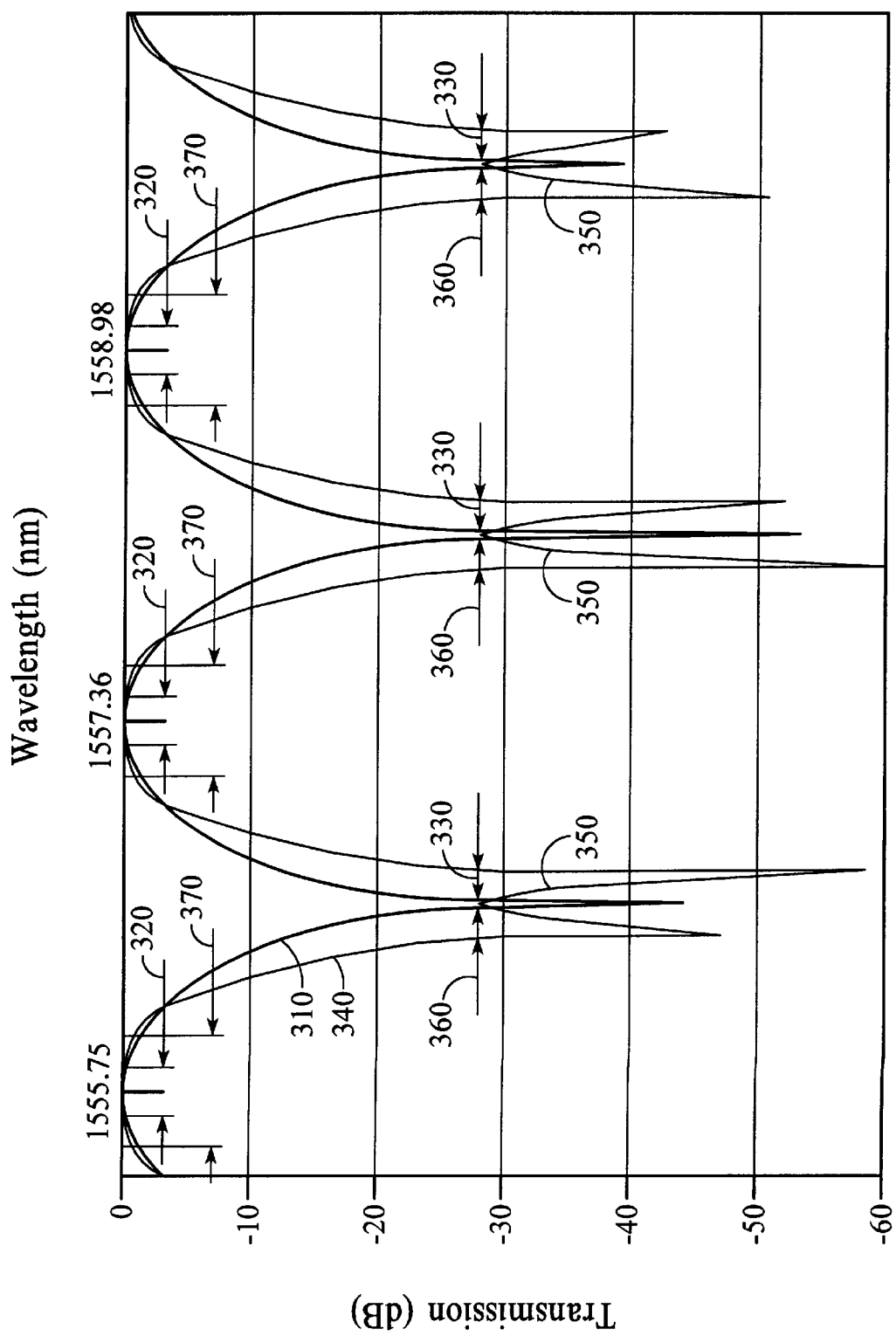
FIG. 3 is a graph of two sample spectrum curves, each comprised of several channels as they enter, respectively, a conventional dense wavelength division multiplexer and a dense wavelength division multiplexer in accordance with the present invention.

To illustrate the advantage of flattening the curve tips and allowing a small amount of band shape distortion, please refer back to FIG. 3. FIG. 3 is a graph of spectrum curve 310 of a signal which would result if the reflective coating 540 has a reflectivity of 0%. This curve 310 has no crosstalk but has a very narrow isolation band 330 and a narrow pass band 320. The spectrum curve 340 is a signal which would result if the reflective coating 540 has a reflective index of approximately 18%. There is a small amount of band shape distortion 350, but because of the existence of the band shape distortion 350, the isolation band 360 is significantly wider. In addition, the tips of the curve are flatter, resulting in a wider pass band 370. The amount of flattening and shape change allowed can be manipulated by selecting a reflective coating with a certain reflectivity. Thus, the separator 400 of the present invention, through manipulation of its interferometer 450, can be used to broaden the pass and isolation bands, which makes the curve more stable and tolerant to drift.

Figure 8:
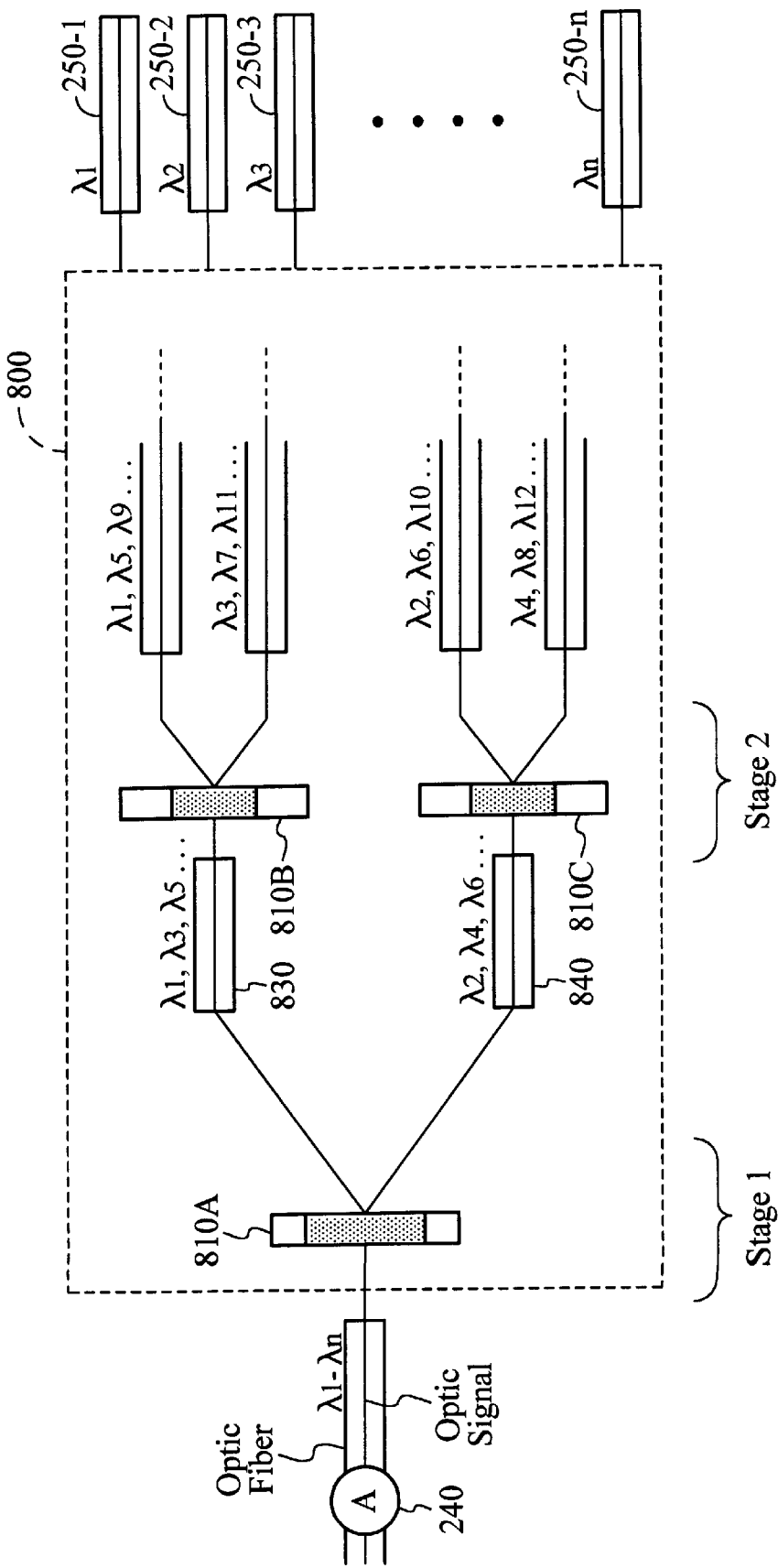
FIG. 8 is a simple block diagram of a wavelength division multiplexer with a multi-stage parallel cascade configuration of separators in accordance with the present invention.

Another advantage of the separators 400 of the present invention is the ability to place them in a multi-stage parallel cascade configuration to reduce insertion loss. This configuration is illustrated in FIG. 8 and has been disclosed in co-pending U.S. Patent Application entitled "Fiber Optic Dense Wavelength Division Multiplexer Utilizing A Multi-Stage Parallel Cascade Method Of Wavelength Separation," Ser. No. 09/130,386, filed on Aug. 6, 1998. Applicant hereby incorporates the application by reference. In FIG. 8, an optical signal containing channels $\lambda_1$–$\lambda_n$ enters the dense wavelength division multiplexer of the present invention 800 through node A (240). The signal passes through a separator of the present invention 810A. The separator 810A divides the signal into two separate signals, one containing the odd channels ($\lambda_1$, $\lambda_3$, $\lambda_5$, . . . )(830) and the other containing the even channels ($\lambda_2$, $\lambda_4$, $\lambda_6$, . . . )(840), as described above with FIGS. 4 through 7. These odd and even channels are each passed through another separator 810B–810C which further divides them by every other channel. This division continues until only one channel is outputted to each optic fiber, 250-1 through 250-n.

Although the separator of the present invention has been described as being utilized with the multistage parallel configuration of the present invention, one of ordinary skill in the art will understand that the separator of the present invention may be utilized with other configurations without departing from the spirit and scope of the present invention.

Figure 9:
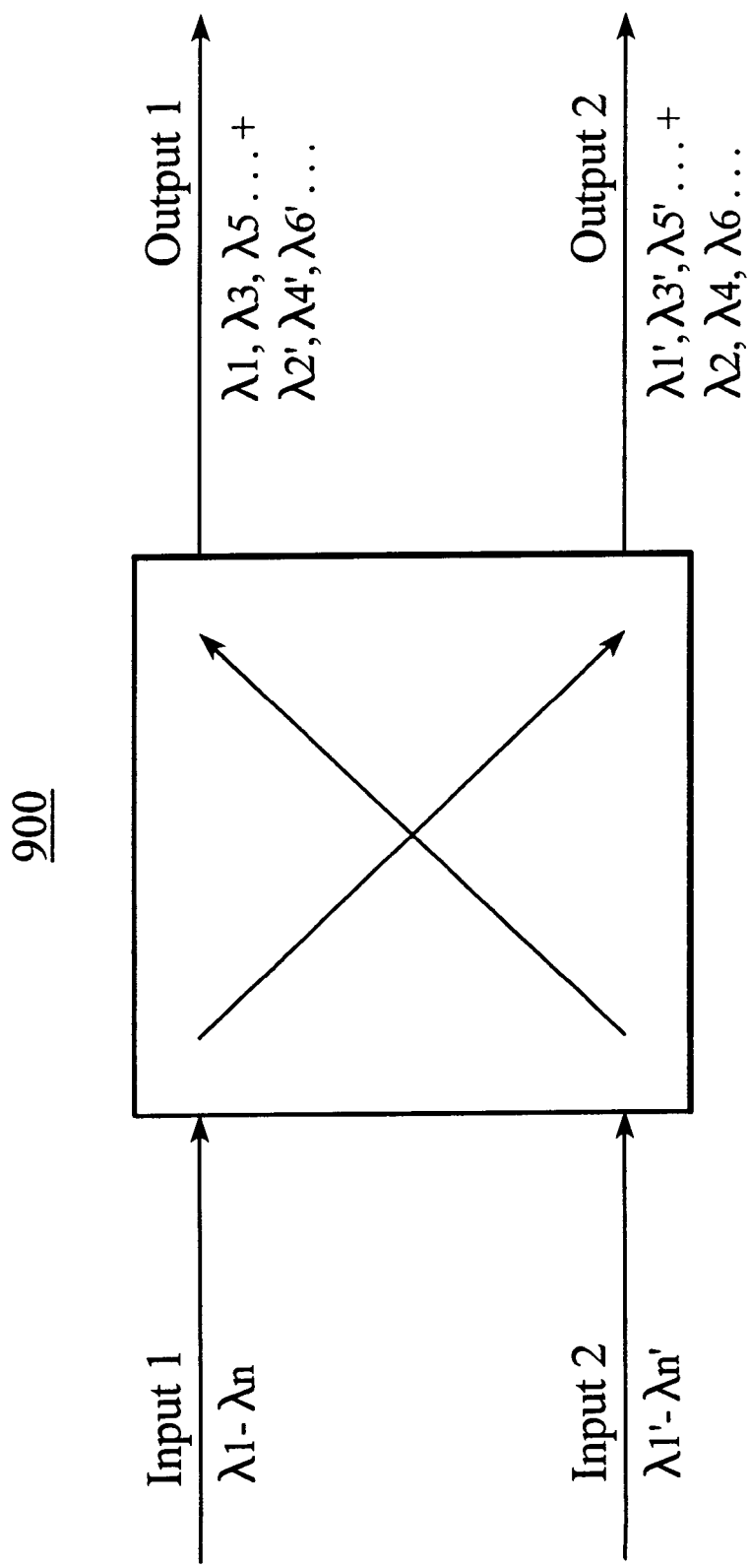
FIG. 9 is a simple block diagram of a separator in accordance with the present invention functioning as a 2×2 switch.

Another added functionality of a separator 400 of the present invention is the ability to perform the add/drop function while also separating the channels. FIG. 9 is a simple block diagram of a separator 900 functioning as a 2×2 switch. As illustrated, two signals containing $\lambda_1$–$\lambda_n$ and $\lambda_1'$–$\lambda_n'$ are input into the separator 900. Device 900 then could drop the even channels of the first signal to the second signal while adding the even channels of the second signal to the first signal.

Figure 10:
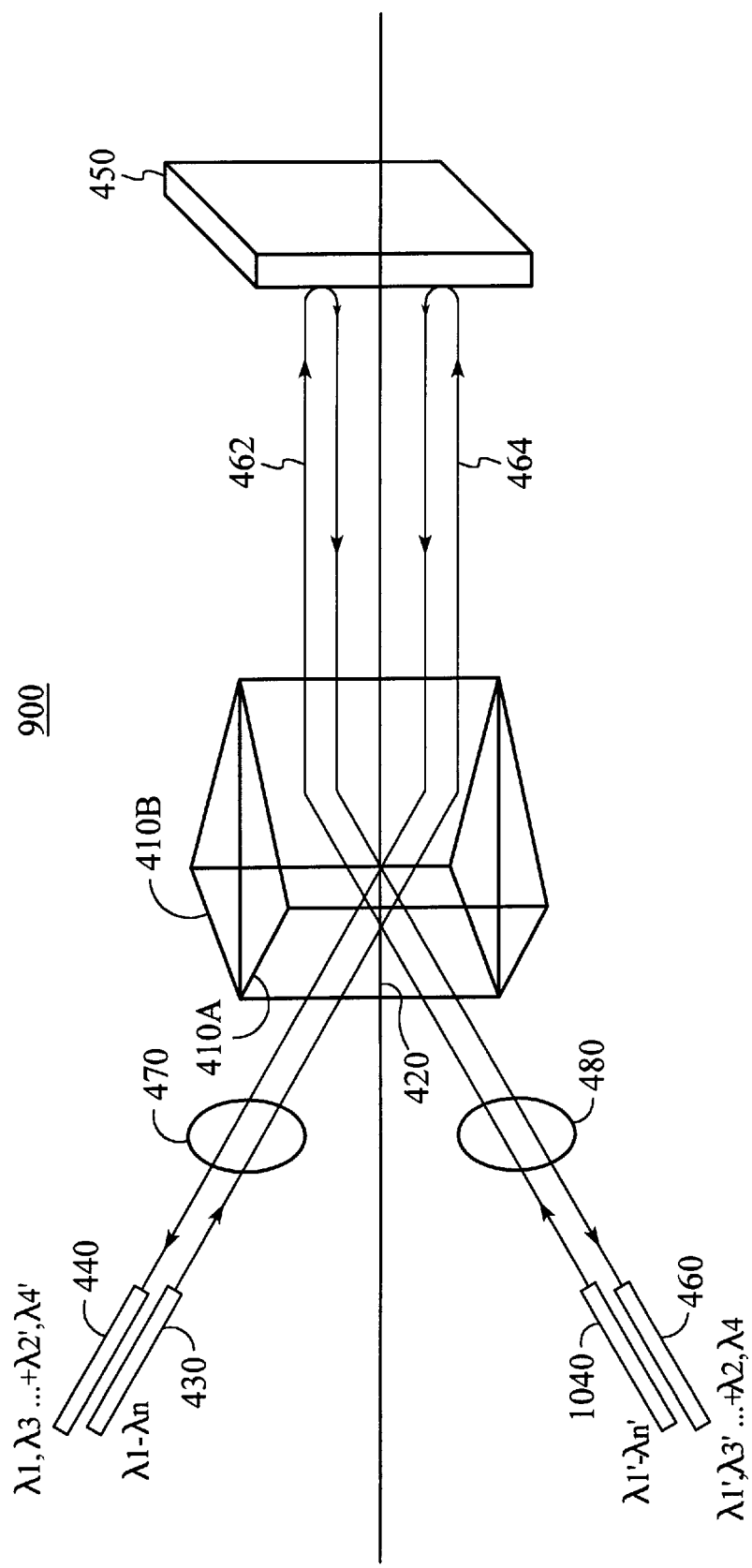
FIG. 10 is an illustration of a separator in accordance with the present invention performing the add/drop function.

To more particularly describe the utilization of a separator to perform the add/drop function, refer to FIG. 10 and the discussion below. FIG. 10 illustrates a separator in accordance with the present invention performing the add/drop function. The separator 900 in FIG. 10 is identical to the separator 400 in FIG. 4 except for the input of a second signal containing $\lambda_1'-\lambda_n'$ via an additional optical fiber 1040. This second signal would be separated into its odd and even channels similarly to the first signal containing $\lambda_1-\lambda_n$ except the output pathways of odd and even channels are the mirror images of odd and even channels, respectively, from fiber 430. The result is that output fiber 440 would contain the odd channels from the first signal ($\lambda_1, \lambda_3, \lambda_5 \ldots$) plus the even channels from the second signal ($\lambda_2', \lambda_4', \lambda_6' \ldots$), and output fiber 460 would contain the even channels from the first signal ($\lambda_2, \lambda_4, \lambda_6 \ldots$) plus the odd channels from the second signal ($\lambda_1', \lambda_3', \lambda_5' \ldots$) By manipulating which separators in a wavelength division multiplexer performs the add/drop function, certain channels can be targeted.

A dense wavelength division multiplexer with a phase differential method of wavelength separation utilizing separators with glass blocks and a nonlinear interferometer has been disclosed. The separators provide an ease in alignment and a higher tolerance to drifts due to the increase in the widths of the pass bands. They may also be placed in a multi-stage parallel cascade configuration to provide for a lower insertion loss by requiring an optical signal to travel through fewer optical components. The present invention may also be easily modified to perform the add/drop function as it separates channels. The materials required to manufacture and implement the dense wavelength division multiplexer in accordance with the present invention are readily available and do not require special or expensive materials or processes. It is thus cost effective.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A dense wavelength division multiplexer for separating an optical signal into optical channels comprising:

means for inputting an optical signal, the optical signal comprising a plurality of optical channels, wherein each channel is an individual information-carrying light of a particular wavelength range;

means for splitting the optical signal into a first portion and a second portion, wherein the splitting means comprises a reflective coating between a plurality of glass blocks with differing indices of refraction, wherein the reflective coating is polarization insensitive;

means for separating a first channel and a second channel of the first and second portions by introducing a phase difference between the first and second channels, wherein the separating means comprises the plurality of glass blocks optically coupled to a nonlinear interferometer; and means for outputting the first channel along a first optical path and the second channel along a second optical path.

2. The dense wavelength division multiplexer of claim 1, wherein the inputting means comprises:

(a) at least one lens optically coupled to the separating means; and (b) at least one optical fiber optically coupled to the lens.

3. The dense wavelength division multiplexer of claim 1, wherein the outputting mans comprises:

(a) at least one lens optically coupled to the separating means; and (b) at least one optical fiber optically coupled to the lens.

4. The dense wavelength division multiplexer of claim 1, wherein the separating means comprises:

(a) a first and a second glass block with differing refractive indices, each glass block comprising a first and second face,
   wherein the first and second faces reside opposite of each other,
   wherein the second face of the first glass block is coupled to the first face of the second glass block,
   wherein the first face of the first glass block is optically coupled to the inputting means;

(b) at least one reflective coating residing on the second face of the first glass block and on a corresponding location on the first face of the second glass block; and (c) a nonlinear interferometer structure optically coupled to the first and second glass blocks.

5. The dense wavelength division multiplexer of claim 4, wherein the reflective coating (b) comprises a reflective coating with reflectivity of 50%.

6. The dense wavelength division multiplexer of claim 4, wherein the nonlinear interferometer (c) comprises:

(c1) a first glass plate optically coupled to a second glass plate, forming a space therebetween;

(c2) a first reflective coating residing inside the space and on the second glass plate;

(c3) a phase bias element residing inside the space; and (c4) a second reflective coating residing inside the space and on the first glass plate.

7. The dense wavelength division multiplexer of claim 6, wherein the first reflective coating (c2) comprises a reflective coating with a reflectivity of 100%.

8. The dense wavelength division multiplexer of claim 6, wherein the phase bias element (c3) is a 180 degree phase bias element.

9. The dense wavelength division multiplexer of claim 6, wherein the second reflective coating (c4) comprises a reflective coating with a reflectivity of approximately 18%.

10. A dense wavelength division multiplexer for separating an optical signal into optical channels comprising:

(a) at least one of a first optical fiber for inputting an optical signal, wherein the optical signal comprises a plurality of optical channels, wherein each channel is an individual information-carrying light of a particular wavelength range;

(b) at least one of a first lens optically coupled to the first optical fiber;

(c) a first and a second glass block with differing refractive indices, each glass block comprising a first and second face,
   wherein the first and second faces reside opposite of each other,
   wherein the second face of the first glass block is coupled to the first face of the second glass block,
   wherein the first and second glass blocks are optically coupled to the first lens;

(d) at least one reflective coating residing on the second face of the first glass block and on a corresponding location on the first face of the second glass block for splitting an optical signal into a first portion and a second portion, wherein the at least one reflective coating is polarization insensitive;

(e) a nonlinear interferometer optically coupled to the first and second glass blocks, wherein the first and second glass blocks and the interferometer introduce a phase difference between a first channel and a second channel of the first and second portions;

(f) at least one of a second optical fiber for outputting either the first channel or the second channel; and (g) at least one of a second lens optically coupled to the second optical fiber.

11. The dense wavelength division multiplexer of claim 10, wherein the reflective coating (d) comprises a reflective coating with a reflectivity of 50%.

12. The dense wavelength division multiplexer of claim 10, wherein the nonlinear interferometer (e) comprises:

(e1) a first glass plate optically coupled to a second glass plate, forming a space therebetween;

(e2) a first reflective coating residing inside the space and on the second glass plate;

(e3) a phase bias element residing inside the space; and (e4) a second reflective coating residing inside the space and on a portion of the first glass plate.

13. The dense wavelength division multiplexer of claim 12, wherein the first reflective coating (e2) comprises a reflective coating with a reflectivity of 100%.

14. The dense wavelength division multiplexer of claim 12, wherein the phase bias element (e3) is a 180 degree phase bias element.

15. The dense wavelength division multiplexer of claim 12, wherein the second reflective coating (e4) comprises a reflective coating with a reflectivity of approximately 18%.

16. A dense wavelength division multiplexer for separating an optical signal into optical channels comprising:

means for inputting an optical signal, the optical signal comprising a plurality of optical channels, wherein each channel is an individual information-carrying light of a particular wavelength range;

means for splitting the optical signal into a first portion and a second portion, wherein the splitting means comprises a reflective coating between a plurality of glass blocks with differing indices of refraction, wherein the reflective coating is polarization insensitive;

means for separating a first channel and a second channel of the first and second portions by introducing a phase difference between the first and second channels, wherein the separating means comprises the plurality of glass blocks optically coupled to a nonlinear interferometer, wherein the nonlinear interferometer comprises, a first glass plate optically coupled to a second glass plate, forming a space therebetween, a first reflective coating residing inside the space and on the second glass plate, a phase bias element residing inside the space, and a second reflective coating residing inside the space and on the first glass plate; and means for outputting the first channel along a first optical path and the second channel along a second optical path.

17. A dense wavelength division multiplexer for separating an optical signal into optical channels comprising:

(a) at least one of a first optical fiber for inputting an optical signal, wherein the optical signal comprises a plurality of optical channels, wherein each channel is an individual information-carrying light of a particular wavelength range;

(b) at least one of a first lens optically coupled to the first optical fiber;

(c) a first and a second glass block with differing refractive indices, each glass block comprising a first and second face, wherein the first and second faces reside opposite of each other, wherein the second face of the first glass block is coupled to the first face of the second glass block, wherein the first and second glass blocks are optically coupled to the first lens;

(d) at least one reflective coating residing on the second face of the first glass block and on a corresponding location on the first face of the second glass block for splitting an optical signal into a first portion and a second portion, wherein the at least one reflective coating is polarization insensitive;

(e) a nonlinear interferometer optically coupled to the first and second glass blocks, wherein the first and second glass blocks and the interferometer introduce a phase difference between a first channel and a second channel of the first and second portions, wherein the nonlinear interferometer comprises, (e1) a first glass plate optically coupled to a second glass plate, forming a space therebetween, (e2) a first reflective coating residing inside the space and on the second glass plate, (e3) a phase bias element residing inside the space, and (e4) a second reflective coating residing inside the space and on a portion of the first glass plate;

(f) at least one of a second optical fiber for outputting either the first channel or the second channel; and (g) at least one of a second lens optically coupled to the second optical fiber.

* * * * *